United States Patent [19]

Hulak

[11] Patent Number: 5,675,997
[45] Date of Patent: Oct. 14, 1997

[54] TRACTOR TRAILER AIR HOSE COUPLING LOCKING DEVICE

[76] Inventor: Andrew Joseph Hulak, 7 Middletown Ave., Atlantic Highlands, N.J. 07716

[21] Appl. No.: 599,409

[22] Filed: Jan. 11, 1996

Related U.S. Application Data

[63] Continuation of Ser. No. 225,576, Apr. 19, 1994, abandoned.

[51] Int. Cl.⁶ ........................................ E05B 73/00
[52] U.S. Cl. ........................... 70/14; 70/58; 70/164; 70/232; 70/258
[58] Field of Search ................ 70/14, 58, 232, 70/258, 57, 158, 163, 164, 166, 170; 280/507; 180/287

[56] References Cited

U.S. PATENT DOCUMENTS

| D. 283,672 | 5/1986 | Greco | D8/331 |
|---|---|---|---|
| 3,004,421 | 10/1961 | Bowler | 70/232 |
| 3,605,457 | 9/1971 | Foster | 70/14 |
| 4,141,569 | 2/1979 | Dilk | 280/507 |
| 4,226,103 | 10/1980 | Strickland | 70/237 |
| 4,325,237 | 4/1982 | Menzie | 70/14 |
| 4,543,984 | 10/1985 | Murry | 137/385 |
| 4,571,964 | 2/1986 | Bratzler | 70/258 X |
| 4,693,096 | 9/1987 | Mercer | 70/14 |
| 4,732,018 | 3/1988 | Crosby | 70/19 |
| 4,738,126 | 4/1988 | Haberle | 70/14 |
| 5,020,347 | 6/1991 | Logan | 70/389 |
| 5,076,077 | 12/1991 | Renne | 70/14 |
| 5,129,243 | 7/1992 | Kassebaum | 70/14 |
| 5,195,339 | 3/1993 | Nee et al. | 70/14 |
| 5,410,894 | 5/1995 | Fox et al. | 70/14 |
| 5,441,295 | 8/1995 | Smith | 70/232 X |

FOREIGN PATENT DOCUMENTS

| 0022102 | 1/1981 | European Pat. Off. | 70/232 |
|---|---|---|---|
| 2458410 | 2/1981 | France | 280/507 |
| 2126549 | 3/1984 | United Kingdom | 70/174 |
| 2215769 | 9/1989 | United Kingdom | 70/58 |

*Primary Examiner*—Lloyd A. Gall
*Attorney, Agent, or Firm*—James K. Luchs

[57] ABSTRACT

A locking device to fit over a tractor trailer or container carrier glad hand air coupling consists of a rectangular cage of cut structural steel with a drilled pin hole and a welded perpendicular flange with a hasp hole as one piece and an angle flange with a hasp hole and plug welded pin as a second piece. In use the flanged cage is placed over the air coupling with the pin hole over the air hole and the pin passed through the pin hole into the air hole and the hasp of a padlock passed through the hasp holes and locked to secure the air coupling. The locking device is fabricated from structural steel and angle irons using conventional cutting, drilling and welding techniques.

6 Claims, 4 Drawing Sheets

TRACTOR TRAILER AIR HOSE COUPLING LOCKING DEVICE

This application is a continuation of Ser. No. 08/225,576 filed Apr. 11, 1994 now abandoned.

FIELD OF THE INVENTION

The invention relates to devices used to prevent the theft of container carriers and tractor trailers. In particular the invention relates to a locking device fitting over an air hose or glad hand coupling on a container carrier or tractor trailer.

BACKGROUND OF THE INVENTION

Because of increased losses due to theft and misappropriation of motor vehicles and trucks and trailors there has been an existing need for security systems and disabling and locking mechanisms. However while much has been done concerning motor vehicles with built in systems and after-market products, very little has been done in providing effective locking devices which can effectively prevent someone from backing up to a parked trailer or container carrier, hitching up and attaching air hoses and driving away. Often a unit prepared for a particular purpose is driven away and later found to be unsatisfactory for that purpose.

One device which is available and in widespread use is a cylindrical locking device selling for about $25 to $35 which fits over the king-pin and keys into a slot. This anti-theft device is described in U.S. Pat. No. 3,004,421.

A number of more recent references are directed to placing a locking device in proximety to a trailer airhose coupling (commonly known as glad hand) and include: U.S. Pat. Nos. 4,226,103; 4,325,237; 4,693,096; 4,732,018; 4,738,126; 5,076,077 and 5,129,243. These prior art devices share a common purpose in being intended to prevent hooking up air hoses without removing the device from either in or around an emergency side airhose coupling. The unavailability of these devices may be as a result of economic or reliability factors. Some of these devices appear to be less than universally useful for both tractor trailers and container carriers and in some cases could be removed without damage to the glad hand using a screwdriver or wrench.

Thus, an unsatisfied need has existed for a means of immobilizing a trailor or container carrier from being moved without authorization. In the absence of a simple and reliable device which is rugged yet easy to use, the king-pin locking device remains the choice of the industry.

SUMMARY OF THE INVENTION

It is an object of the invention to provide a locking device to fit over an air coupling on a trailer or container carrier and be secured with a padlock comprising a pin hole cage with an integral flange and an angle flange with an integral pin wherein the pin is inserted into an air supply hole through the pin hole in the cage and secured with a padlock hasp through hasp holes in the flanges so that the air supply connection is encased and rain cannot enter the air hole. While a rectangular sided cage is adequate for 90% of existing glad hands, larger dimension glad hands can be accomodated by cutting sections out of the cage.

An alternate device has the angle flange and integral pin slide up and down so that the cage can be placed over the air coupling and the pin inserted into the air hole and be secured with a padlock hasp through the two hasp holes.

The invention provides a means for securing a fleet of similar looking trailers and/or container carriers and protecting against freezing in the emergency side air line using a flanged pin hole cage and angle flange pin locking device and a padlock key inventory and control system.

DETAILED DESCRIPTION OF THE INVENTION

Figure 1:
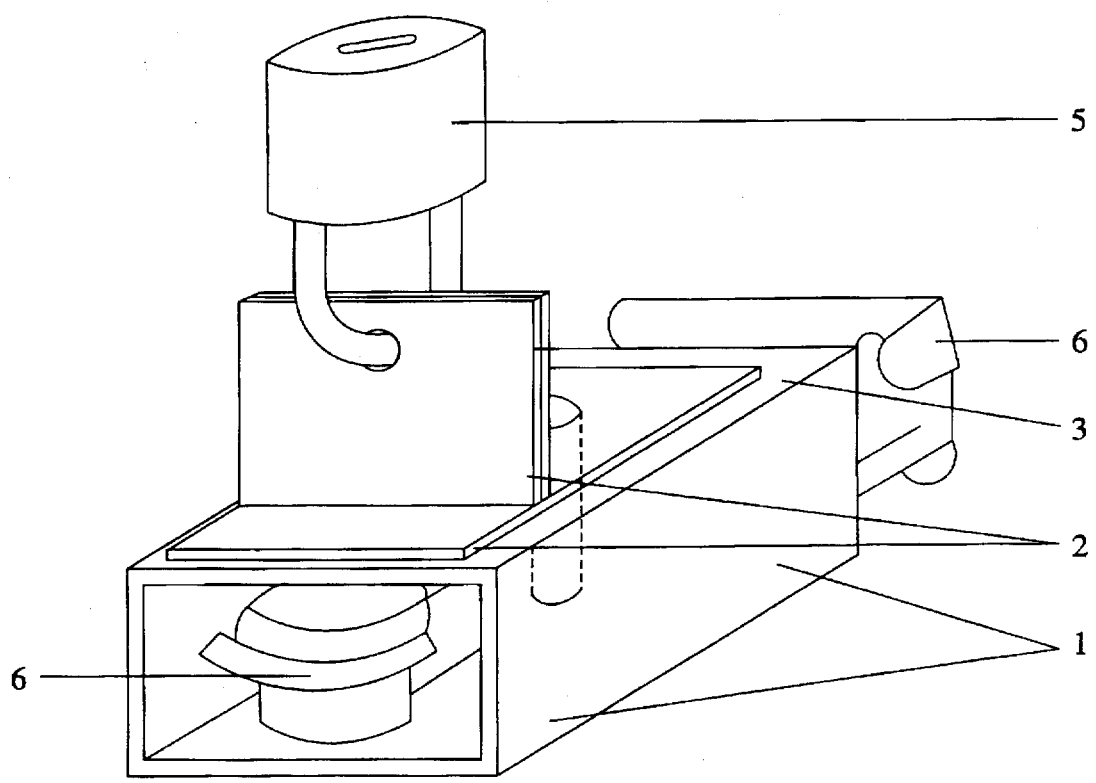
FIG. 1 The device is shown in a locked position on an air supply coupling.

The commonly used kingpin lock in use to prevent the theft or unauthorized movement of air brake equipped trailers can be defeated when the device is broken by forcefully backing the trailer hitch into it and removing the broken device. Because of the problem of grease buildup on the kingpin lock it is a dirty job to crawl underneath to attach or remove the padlock. A grease fire problem exists if the device must be removed with a torch. It is a common problem that the driver does not notice this device is present and damages it so that it must be removed with a torch even if the grease smokes or burns during the process.

Despite the description of numerous glad hand and air supply covering and kocking devices, it is the king-pin lock which remains in use and is listed in supply catalogs. What has been revealed in the patent literature is an unsatified need for a simple and rugged locking device which would be suitable for both trailers and carriers without requiring special glad hand attachments or mechanisms.

It has now been discovered that it is more effective to prevent theft of or unauthorized movement of air brake equipped trailers with a novel cage and pin device. In addition to acting as a locking device which is rugged and simple to use, during the winter this device prevents water from entering the air hole and freezing so that ice in the line will prevent the brakes from being released. Attempts to break this device covering the emergency side air coupling (glad hand) will disable the trailer since the brakes can not be released once the coupling has been damaged by accident or during a theft attempt. If the device is used on the service side coupling there would be no braking action from the trailer brakes. Locking devices can be placed on both air couplings as a means to make a highjacker remove both padlocks in order to operate the trailer with the air brakes.

Unlike other prior art locking devices which can only function with a glad hand with special or modified fittings and attachments, the inventive device can be made to accomidate all known air hose couplings on both tractor trailers and container carriers. Further a system of inventory can be established in which keys to the padlocks are signed in and out to insure that a unit prepared for a particular purpose is used and not some other unit which looks to be the same.

The device can be conveniently constructed from aluminum, cast iron or steel welded and drilled. Other metals and metal fabrication techniques could be employed as long as a functional device results for which the cost is not prohibative. Conventional stamping, drilling and welding techniques can be employed. The mig welding technique is preferred, but arc and tig welding can also be used. Because of the simple and rugged nature of the device it would be possible to be produced using other techniques such as die and cast molding.

While a rectangular sided cage is adequate to fit over 90% of air hose couplings, there are some which would require a cut out in the lower portion of the cage. Even with this cutout a locking device suitable for either the majority or minority of couplings would be adequately secured by the pin in the air hole.

DETAILED DESCRIPTION OF THE DRAWINGS

FIG. 1 The device consists of two parts the larger of which is (1) a rectangular surface cage with a pin hole and (2) a welded flange with a hasp hole and the smaller part (3) an angle flange with a hasp hole and a welded pin with (5) a locked padlock to secure the device over (6) an air coupling (glad hand) where the pin fits inside an air hole.

Figure 2:
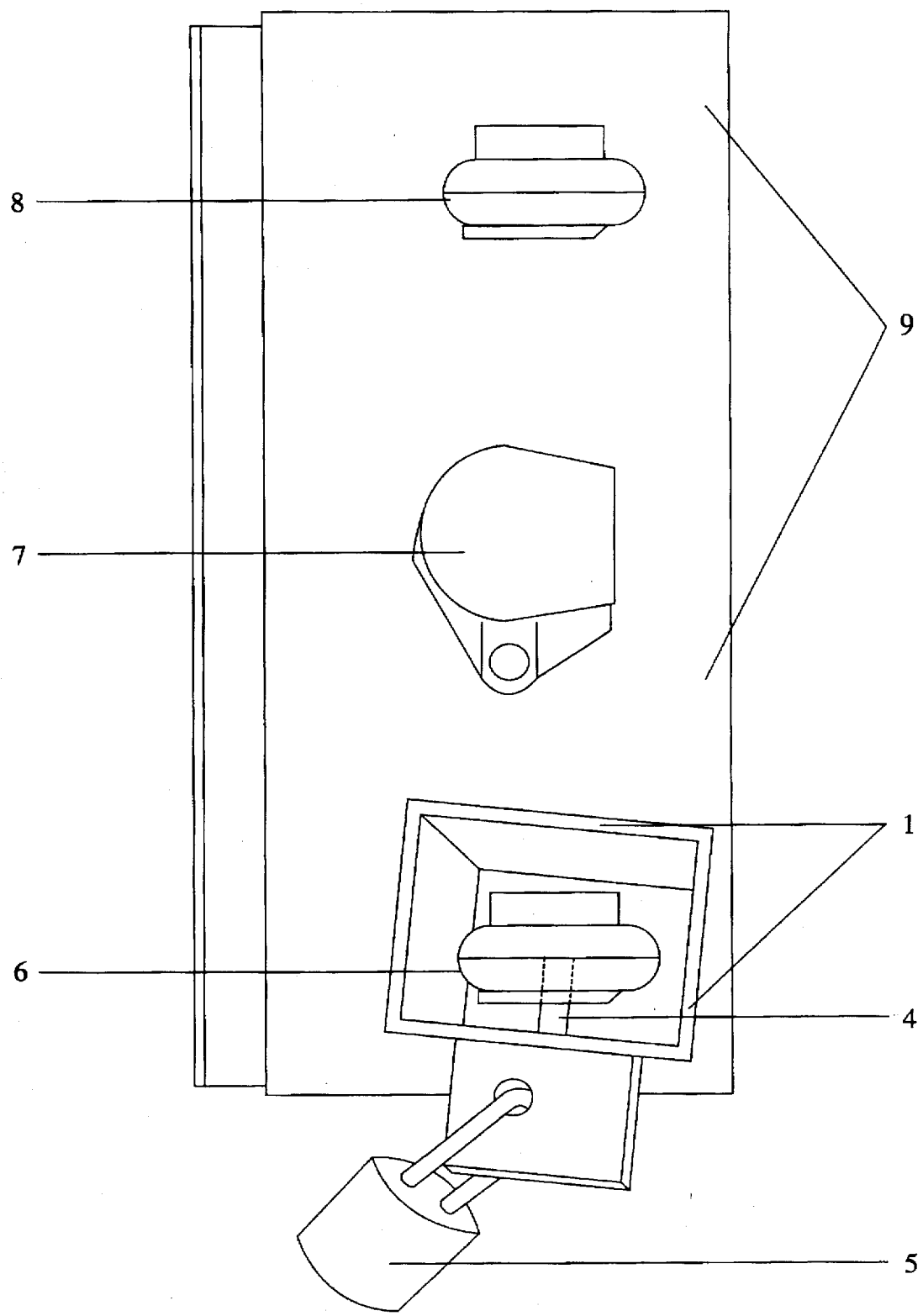
FIG. 2 The device is shown as it would be placed on the emergency side air supply coupling next to the light hookup on a trailer.

FIG. 2 The positioning of the two part locking device secured with (5) a padlock is shown where (1) a rectangular surface cage with a pin hole and a welded flange with a hasp hole and an angle flange with a hasp hole and (4) a welded pin and (6) an emergency side air coupling and (7) trailer light connection and (8) a supply side air coupling mounted on (9) a trailer header panel.

Figure 3:
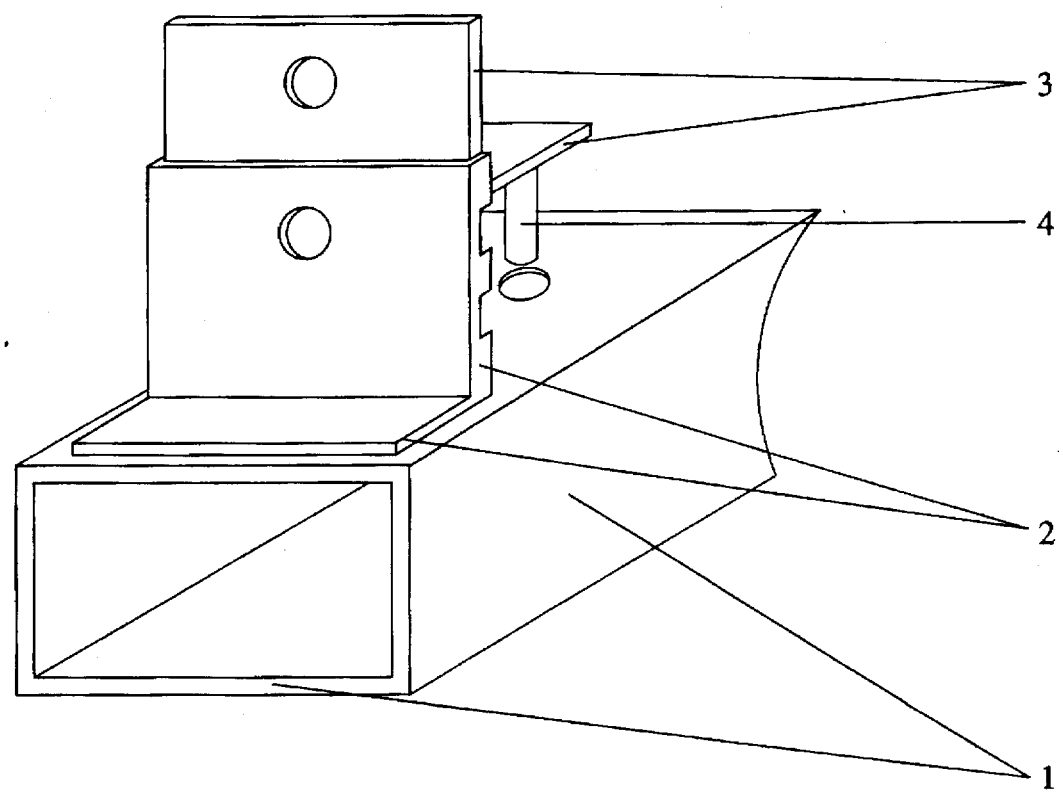
FIG. 3 An alternate device is shown where the angle flange and pin are interconnected with the cage.

FIG. 3 The device is illustrated in sliding combination of the cage and angle flange/pin with (1) rectangular surface cage (2) flange with slide and stop (3) angle flange in upward position so that (4) pin does not block an airhose coupling from entering into the cage, and a portion of the cage is cut away to allow the cage to fit over larger sized couplings or glad hands.

Figure 4:
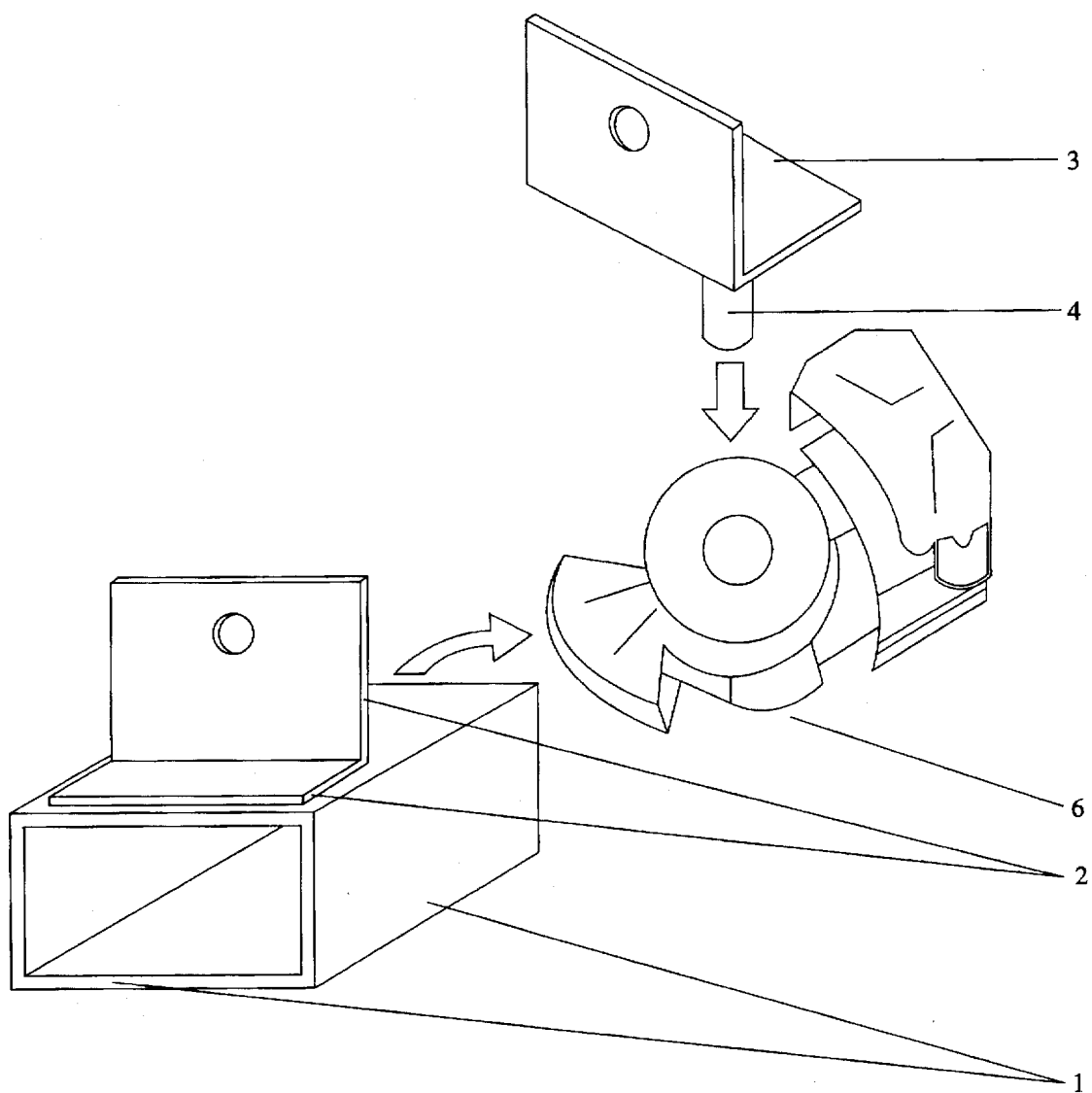
FIG. 4 A diagram drawing illustrates how the two parts of the device fit over an airhose coupling.

FIG. 4 The two parts of the device are shown as being moved to fit where (1) the cage with pin hole and (2) welded flange with hasp hole and (3) the angle flange with hasp hole and (4) plug welded pin in relation to (6) a trailor air coupling showing the air hole into which (4) the pin fits into through the cage pin hole.

The invention has industrial applicability for military as well as civilian truck transportation to prevent the unauthorized movement of air brake equipped tractor trailers or container carriers. The following procedures and examples which are not intended to be limiting illustrate the practice of the invention.

PROCEDURE A

A length of rectangular structural steel is cut into a section of the size to form a cage over a standard air supply coupling. A hole fitting a steel pin is drilled into the cage. An angle iron is cut and drilled with a hasp hole and mig welded on the plane of the cage with the drilled pin hole to produce a perpendicular flange. An angle iron of the same size used to prepare the flange is drilled with a hasp hole and a pin hole. A pin is inserted into the drilled pin hole and mig plug welded. Rough edges are smoothed so the two parts of the locking device can be safely handled. Optionally the device can be painted or color coded.

EXAMPLE 1

A locking device comprising two welded and drilled steel pieces was fabricated as in Procedure A and used as shown in FIGS. 1 & 2 to cover an emergency side air coupling and was conveniently secured with a padlock so that a trailer prepared for a specific purpose could not be moved without obtaining the key. The device was evaluated to be superior in use to conventional kingpin devices which must be burned off if damaged.

EXAMPLE 2

A locking device as illustrated in FIG. 3 provides the advantage that the two pieces are held together for convenience. The sliding mechanism and stop make the tolerances tighter on this device so that different devices would be needed to match variations in air couplings.

EXAMPLE 3

The locking device of Example 1 is modified by cutting away a portion of the lower rectangular face of the cage such that the cage can fit over an air supply coupling which is thicker in the vicinity of the air hole than about 90% of the couplings in current use.

EXAMPLE 4

Locking devices produced as in Procedure A were painted white and other colors to provide better visibility and for color coding such that they can be used in a security and inventory control system for tractor trailers and container carriers as part of a fleet operation. Access to keys to the padlocks on the locking devices is controlled using a sign in and sign out sheet. When maintenance and cleaning has been completed on a unit the operator secures the device on the emergency side glad hand with the padlock and the key is signed in thereby indicating that the unit is ready. The driver assigned to take that unit then signs out the key and unlock the padlock and removes the device. The device with padlock and key are returned to be used again in this system of inventory control.

What is claimed is:

1. A two piece air hose coupling locking device comprising (1) a four-sided cage having a rectangular channel therethrough and having on one side a flange with a hasp hole and a hole for an insert, and (2) a right angle flange with a hasp hole and an insert to pass through the cage insert hole into an air hole in an air hole coupling when the hasp holes on the cage and right angle flange are adjacent in order to allow a hasp on a padlock to secure the locking device to cover the coupling.

2. The locking device of claim 1 where the hole for the insert is circular.

3. The locking device of claim 2 where the insert is a pin.

4. The locking device of claim 3 where the pin fits into the air hole to prevent water from freezing.

5. The locking device of claim 1 wherein said device is fabricated from steel.

6. The locking device of claim 5 wherein said device may be fabricated by means of cutting, drilling and welding.

* * * * *